(12) United States Patent
Knab et al.

(10) Patent No.: US 10,761,505 B2
(45) Date of Patent: Sep. 1, 2020

(54) SAFETY CONTROLLER AND SAFETY SYSTEM

(71) Applicant: SICK AG, Waldkirch/Breisgau (DE)

(72) Inventors: Danilo Knab, Emmendingen (DE); Mathias Ams, Denzlingen (DE); Dennis Münich, Freiburg (DE)

(73) Assignee: SICK AG, Waldkirch/Breisgau (DE)

( * ) Notice: Subject to any disclaimer, the term of this patent is extended or adjusted under 35 U.S.C. 154(b) by 17 days.

(21) Appl. No.: 16/195,133

(22) Filed: Nov. 19, 2018

(65) Prior Publication Data
US 2019/0155240 A1  May 23, 2019

(30) Foreign Application Priority Data
Nov. 21, 2017 (DE) .......................... 10 2017 127 486

(51) Int. Cl.
*G05B 19/042* (2006.01)
*G01V 8/20* (2006.01)
*F16P 3/14* (2006.01)
*G08B 21/18* (2006.01)

(52) U.S. Cl.
CPC .......... *G05B 19/0428* (2013.01); *F16P 3/141* (2013.01); *F16P 3/144* (2013.01); *G01V 8/20* (2013.01); *G08B 21/187* (2013.01); *G05B 2219/24008* (2013.01)

(58) Field of Classification Search
None
See application file for complete search history.

(56) References Cited

U.S. PATENT DOCUMENTS

| 6,608,638 B1* | 8/2003 | Kodosky | G06F 30/34 715/771 |
| 7,486,386 B1* | 2/2009 | Holcombe | G01S 7/497 356/4.01 |
| 2009/0058642 A1* | 3/2009 | Fukumura | G01V 8/20 340/556 |

(Continued)

FOREIGN PATENT DOCUMENTS

| DE | 202017102411 U | 6/2017 |
| EP | 1331433 A2 | 7/2003 |

(Continued)

OTHER PUBLICATIONS

Search Report dated Apr. 18, 2019 issued in corresponding European Application No. 18206504.5.

(Continued)

*Primary Examiner* — Jason Lin
(74) *Attorney, Agent, or Firm* — Nath, Goldberg & Meyer; Jerald L. Meyer

(57) ABSTRACT

The present invention relates to a safety controller for the safety-directed monitoring and control of a machine, said safety controller having at least one monitoring input that is configured to receive a detection signal from a protective device; at least one control output that is configured to output a shutdown signal to the machine to be monitored and to be controlled; at least one bypass input that is configured to receive a bypass demand from an independent control system. The invention further relates to a safety system having a safety controller and having at least one protective device connected to the safety controller.

18 Claims, 1 Drawing Sheet

(56) References Cited

U.S. PATENT DOCUMENTS

| | | | | |
|---|---|---|---|---|
| 2010/0194583 A1* | 8/2010 | Kawabata | ............... | F16P 3/144 |
| | | | | 340/3.6 |
| 2015/0301221 A1* | 10/2015 | Kikuchi | .................. | G01V 8/20 |
| | | | | 250/208.2 |
| 2016/0097878 A1* | 4/2016 | Kikuchi | .................. | G01V 8/20 |
| | | | | 250/221 |
| 2017/0052278 A1* | 2/2017 | Stein | ........................ | G01V 8/20 |
| 2017/0091169 A1* | 3/2017 | Bellegarda | ............ | G06F 16/353 |

FOREIGN PATENT DOCUMENTS

| | | |
|---|---|---|
| EP | 1331434 A2 | 7/2003 |
| EP | 1494048 A1 | 1/2005 |
| EP | 2 306 063 B1 | 4/2015 |
| EP | 2853677 A1 | 4/2015 |
| EP | 2975434 A1 | 1/2016 |
| EP | 3133423 A1 | 2/2017 |
| JP | 2001-71192 A | 3/2001 |

OTHER PUBLICATIONS

Official Letter dated Aug. 6, 2018 issued in corresponding German Application No. 10 2017 127 486.3.

\* cited by examiner

SAFETY CONTROLLER AND SAFETY SYSTEM

FIELD

The present invention relates to a safety controller for the safety-directed monitoring and control of a machine, said safety controller having at least one monitoring input that is configured to receive a detection signal from a protective device; at least one control output that is configured to output a shutdown signal to the machine to be monitored and to be controlled; at least one bypass input that is configured to receive a bypass demand from an independent control system; and having an evaluation unit that is connected to the monitoring input, to the bypass input, and to the control output and that is configured to generate the shutdown command on the basis of a received detection signal, wherein the safety controller is operated in a bypass mode for a predefinable bypass time period divided into one or more part time periods after the reception of a bypass demand, with no shutdown command being output in the bypass mode at least during a part time period even on a reception of a detection signal.

BACKGROUND

For safety reasons, accesses to hazardous areas of machines are secured by protective devices, in particular electro-sensitive protective equipment that initiates suitable protective measures on an unintended or unauthorized penetration of persons into this hazardous area. Optoelectronic sensors such as light barriers, light curtains, light sensors, light scanners or the like or also ultrasound sensors are used as protective devices, for example. An object registration signal or a detection signal is generated on an infringement of a protective field. If such a detection signal is received, a corresponding shutdown command is generated that as a rule results in an immediate shutdown of the machine or that at least sets the machine to a state in which a danger to persons is excluded. However, it is necessary for a proper operation of the machine that workpieces to be machined can be supplied to the machine without hindrance and can also be led away from it again without in infringement of a protected field that necessarily occurs interrupting the operation of the machine in so doing.

For this purpose, a safety controller of the category is used that is connected both to the protective device and to the machine to be monitored and has at least one bypass input also called a muting input. It can be signaled to the safety controller via this bypass input that a workpiece has to pass through the protected field of the protective device. The signaling independent control system can in particular be a control system that is also provided for a process control of the machine to be monitored and in particular also for a the control of a conveying device coupled to the machine. If the safety controller receives such a muting or bypass demand, the safety controller switches to the bypass mode that is also called muting operation. The detection signal that necessarily occurs on the entry of the workpiece into the protected field is ignored in this bypass mode in a manner such that at least no shutdown command is output to the machine to be monitored and controlled.

It is necessary for a safe and simultaneously reliable operation of the machine that the time duration for which the safety controller is operated in the bypass mode is adapted to the time duration that a workpiece requires to pass the protective device. If the bypass mode is active for longer than necessary, there is a risk that persons can penetrate into the machine in an unrecognized manner in front of or behind a workpiece. On the other hand, too short an operating duration in the bypass mode has the result that a workpiece that is permitted per se is recognized as a supposedly not allowed object and that a shutdown command is accordingly incorrectly output that leads to an unnecessary standstill of the machine.

A safety controller of the category is described in EP 2 306 063 B1, for example. In this safety controller, a check is first made after the reception of a bypass demand whether a detection signal is generated by the protective device within a predefined time interval, with this time interval amounting to a maximum of 4 s. If this condition is satisfied, the protective device is bypassed for a specific time duration, i.e. the safety controller is operated in a bypass mode so that an object detection by the protective device no longer results in a shutdown command for the machine and a workpiece can thereby pass the protective device. The safety controller and the protective device are integrated in a so-called safety sensor, whereby it can be difficult to obtain diagnostic information in the event of any error function. In addition, the temporal relationships in the protected field monitoring are fixedly parameterized so that flexibility and safety are restricted.

SUMMARY

It is the object of the present invention to provide a safety controller in which flexibility and safety are increased.

In accordance with the invention, at least one configuration input is provided that is connected to the evaluation unit and that is adapted to receive a respective configuration signal, with the evaluation unit being configured to determine the bypass time period and/or at least a part time period of the bypass time period on the basis of the received configuration signal.

It is therefore possible with the aid of the configuration input or inputs to parameterize the timing of the safety controller in a simple manner. The bypass time period or one or more part time periods can thereby be adapted to the length of permitted objects or workpieces that should pass the protective device without hindrance and/or should be adapted to their transport speed. The configuration signals can be transmitted statically or also dynamically, which will be explained in more detail in the following.

The safety controller can in particular be designed as a separate assembly that can be used in a modular manner in conjunction with protective devices and machines of different types of construction.

Said bypass time period or part time periods are respective time intervals, with the determination of these time periods in the sense of the present invention comprising the fact that, for example, starting times, time durations and/or end times are predefined for these time periods, with the part time periods not necessarily having to be predefined within the monitoring time periods, but rather with their start and/or end being able to be triggered by respective signals, for example detection signals or bypass demands. Said part time periods do not necessarily have to be after one another in time, but can rather also overlap in time, which will be explained in more detail in the following.

At least two redundant bypass inputs, in particular bypass inputs complementary to one another, can advantageously be used that have to receive the bypass demands that are in particular synchronous with one another to activate and/or deactivate the bypass mode. The risk of a safety-relevant malfunction of the safety controller, that is due to line damage, for example, is thereby considerably reduced.

The safety controller can advantageously have a plurality of monitoring inputs with which a respective one or more bypass inputs are associated. In this manner, a plurality of entry points or exit points of the machine can be monitored with only one safety controller that is connected to respective protective devices connected to one of the monitoring inputs.

The term "shutdown command" for the purposes of this text also comprises a command for transitioning into a secure locked state in which a hazardous operation no longer takes place (that is the hazardous operation is shut down) without the machine being completely switched off.

In accordance with an advantageous embodiment of the invention, the evaluation unit is configured to determine a failure state and in particular to provide a signal at a failure output of the safety controller when an expected detection signal was not received within the bypass time period and/or within at least a part time period and/or an expected ending of a reception of a detection signal or of a bypass demand has not taken place. Such a failure state can, for example, be determined when an object that was expected at a specific point in time due to the reception of a corresponding bypass demand from the safety controller did not pass the protective device or only passed it with a delay. A condition in which an object has not yet left the protected field after the end of the bypass demand and in which corresponding detection signal is therefore received can also be registered as a failure state. The determination of a failure state thus not only comprises possible defects in components of the safety controller or of components associated therewith, but rather generally a difference from regular operation that could also be safety-critical under certain circumstances. The determination of a failure state in particular also comprises a storage of a corresponding error message, for example in the form of a flag or of an error code that can in particular also provide information on the kind of the failure state.

This failure state can advantageously be signaled to a failure output, for example in the form of a signal lamp or of another display apparatus that can advantageously also provide information on the kind of the failure state.

In an advantageous embodiment, a shutdown command is only output after the detection of a failure state when a detection signal has been received. Unlike a conventional safety controller, in particular unlike the safety controller described in EP 2 306 063 B1, in which a non-arrival or a delayed arrival of an expected object results in an immediate output of the shutdown command, the machine is only shut down in this advantageous embodiment of the machine when an object actually passes through the protected field. This in particular proves advantageous during maintenance and setup work of the total system of safety controller, protective device, and machine to be monitored. If, for example, a bypass demand transmitted by the independent control system is received even though no object should pass the protective device, the machine is nevertheless not stopped as long as an object or a person does not attempt to move through the protected field into the hazardous region to be monitored. Since the shutdown command is output in every case when the safety controller is in the failure state and a detection signal has been received, safety is in no way impaired. The failure state can, for example, be canceled again by a manual reset, with the cancellation being able to take place independently of whether a detection signal resulting in a shutdown command was received or not during the failure state.

Provision is made in accordance with a further advantageous embodiment that one of the part time periods is a predefinable latency time period within which a detection signal has to be received so that no failure state is determined, with the evaluation unit being configured to determine the first latency time period on the basis of the received configuration signal. The first latency time period in particular defines the time period that may elapse at a maximum after the reception of a bypass demand until an object interrupts the protected field for the first time and thus triggers the detection signal. It is, for example, possible through the possibility of adapting this latency time period on the basis of the configuration signal to operate a conveyor belt that leads objects to the machine or transports objects through the machine at different conveying speeds. If, for instance, an object is transported more slowly than usual, the latency time can be correspondingly extended so that no determination of a failure state occurs on a resulting later arrival of the object in the protected field.

In accordance with a further advantageous embodiment, one of the part time periods is a predefinable detection time period over which a previously received detection signal has to last so that no failure state is determined, with the evaluation unit being configured to determine the detection time period on the basis of the received configuration signal. The previously received detection signal is in particular the detection signal received during the first latency time period. The detection time period can, for example, be adapted to the length and/or to the transport speed of an object to be transported.

The evaluation unit is in particular configured to determine a minimum value and/or a maximum value for the duration of the detection time period on the basis of the received configuration signal. It is ultimately thereby ensured that the safety controller is only operated in the bypass mode for as long as is required due to the length and the transport speed of the object. The minimum value and/or the maximum value can in particular be dynamically adapted.

Provision is made in accordance with a further advantageous embodiment that one of the part time periods is a predefinable latency time period, with the operation in the bypass mode being ended if no detection signal is received for the duration of the second latency time period and/or if the reception of the detection signal is also ended after ending the reception of the bypass demand within the second latency time period, with the evaluation unit being configured to determine the second latency time period on the basis of the received configuration time period.

The start of the second latency time period is therefore in particular triggered by an omission of the detection signal or of the bypass demand. A temporary interruption of the detection signal that is shorter than the second latency time does not lead to an ending of the bypass mode operation. The second latency time period is here therefore ended prematurely and can again be retriggered again by a corresponding event. It is thereby in particular ensured that short gaps in the transported products that results in a corresponding brief release of the protected field do not have the consequence of a premature ending of the bypass mode and malfunctions and/or an incorrect determination of a failure state is/are avoided.

One of the part time periods is advantageously a predefinable third latency time period within which the reception of the bypass demand has to have ended after ending of the operation of the safety controller in the bypass mode so that no failure state is determined, with the evaluation unit being configured to determine the third latency time period on the basis of the received configuration signal. It is ensured by the monitoring of the third latency time period that a bypass demand cannot remain present for an excessively long time, i.e. for a longer time period than the passage time of an object through the protected field would require.

In accordance with a further advantageous embodiment of the invention, the configuration input is configured to receive the configuration signal from the independent control system. Since the independent control system can in particular be a control system that is also provided for a process control of the machine to be monitored and in particular also for a control of a conveying device coupled to the machine, the independent control system is therefore as a rule "informed" of the speed and/or the dimensions of objects for which a bypass demand should be output. The independent control system can thus configure an adapted timing for said bypass time periods or part time periods, in particular the latency time periods, in the safety controller, with this configuration also being able to take place dynamically, i.e. e.g. individually for each object.

Alternatively or additionally, an encoding apparatus connected to the configuration input can be provided that is configured to generate the configuration signal. The encoding apparatus can have one or more switches, for example, A configuration by means of an encoding apparatus is rather to be considered static.

The configuration signal or signals can be transmitted as a numerical value, for example, by the independent control system and/or by the encoding apparatus. Furthermore, corresponding values for said time periods can also be stored in the evaluation unit, for instance in the form of a look-up table and can be activated according to a logic value transmitted by the independent control system and/or by the encoding apparatus.

In accordance with a further advantageous embodiment, a plurality of configuration inputs are provided, with the configuration signals being transmitted as a 1 of n code (1-of-n-code). Such a 1 of n encoding is called a one hot encoding. It is here a binary encoding of a configuration signal, with each configuration input being able to receive 0 or 1. A high redundancy is thus achieved.

The present invention further relates to a safety system having a safety controller in accordance with any one of the preceding claims and having at least one protective device connected to the safety controller. The safety controller and the protective device are advantageously designed as separate assemblies, but can also be arranged in an integrated assembly. The protective device is advantageously a piece of electro-sensitive protective equipment, in particular an optoelectronic sensor or an ultrasound sensor. Exemplary optoelectronic sensors were named at the beginning.

Further advantageous embodiments of the invention result from the dependent claims, from the description and from the drawing.

BRIEF DESCRIPTION OF THE DRAWINGS

The invention will be described in the following with reference to an embodiment and to the drawing. There are shown.

DETAILED DESCRIPTION

Figure 1:
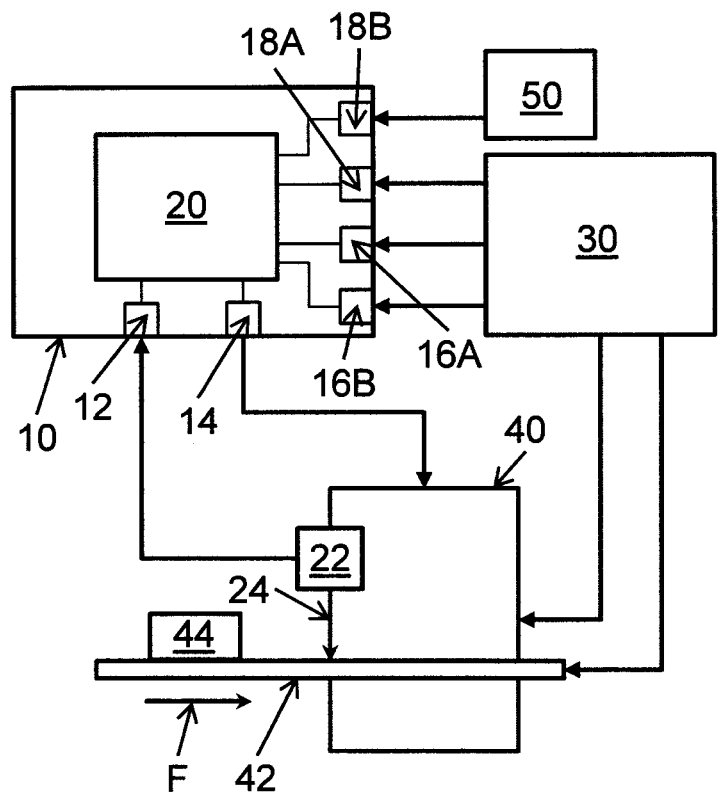
FIG. 1 a schematic block diagram of a safety controller in accordance with an embodiment of the present invention that is connected to a machine and to a protective device.

FIG. 1 schematically shows a safety controller 10 for a safety-directed monitoring and control of a machine 40 in accordance with an embodiment. The safety controller 10 comprises an evaluation unit 20 that is connected to a monitoring input 12, to a control output 14, to two bypass inputs 16A, 16B, and to two configuration inputs 18A, 18B. The number of said inputs and outputs is here only by way of example, i.e. more—or in the case of the bypass inputs 16A, 16B and of the configuration inputs 18A, 18B—also fewer inputs or outputs can also be used.

The monitoring input 12 is connected to a protective device 22 that is arranged at the machine 40 for monitoring a protected field 24. The protective device 22 is here only shown schematically. It can, for example, be configured as a piece of electro-sensitive protective equipment, in particular as an optoelectronic sensor. Objects 44 can be introduced into the machine 40 in a conveying direction F via a conveyor belt 42. If the protected field 24 of the protective device 22 is interrupted or infringed by an object 44 or by a person, a detection signal is transmitted to the safety controller 10.

The control output 14 is connected to the machine 40, with a shutdown command transmitted via the control output 14 stopping the machine or at least changing it into a safe locked state in which a risk for persons penetrating into the machine 40 is excluded The machine 40 is furthermore connected to an independent control system 30 that carries out a process control of the machine 40. The control of the conveyor belt 42 likewise takes place via the control system 30.

In accordance with a modification, the conveyor belt 42 can also be connected to a further control output of the safety controller 10 so that the conveyor belt 42 is also integrated into the monitoring and control by the safety controller 10.

The control system 30 is furthermore also connected to the bypass inputs 16A, 16B and to the configuration input 18A.

If an object 44 is to be transported into the machine 40 and if it has to pass through the protected field for this purpose, the control system 30 transmits a corresponding bypass demand to the safety controller 10 via the bypass inputs 16A, 16B. Due to this bypass demand, the safety controller 10 changes into a bypass mode for a predefinable bypass time period.

The evaluation unit 2 suppresses or bypasses a detection signal generated by the protective device 22 and triggered by the object 44 at least during a part time period so that no shutdown command is output to the control output 14 for a specific time duration even though the protected field 24 is interrupted. The object 44 can thereby be transported into the machine 40 without hindrance without a shutdown of the machine 40 taking place.

The control system 30 can transmit configuration signals to the evaluation unit 20 via the configuration input 18A. The configuration input 18B is furthermore connected to an encoding apparatus 50 via which configuration signals can likewise be transmitted to the evaluation unit 20.

The evaluation unit 20 is configured to determine the bypass time period and/or at least a part time period of the bypass time period on the basis of the configuration signals received by the encoding apparatus 50 and/or by the control system 30, which will be explained in more detail in the following with reference to FIG. 2.

Figure 2:
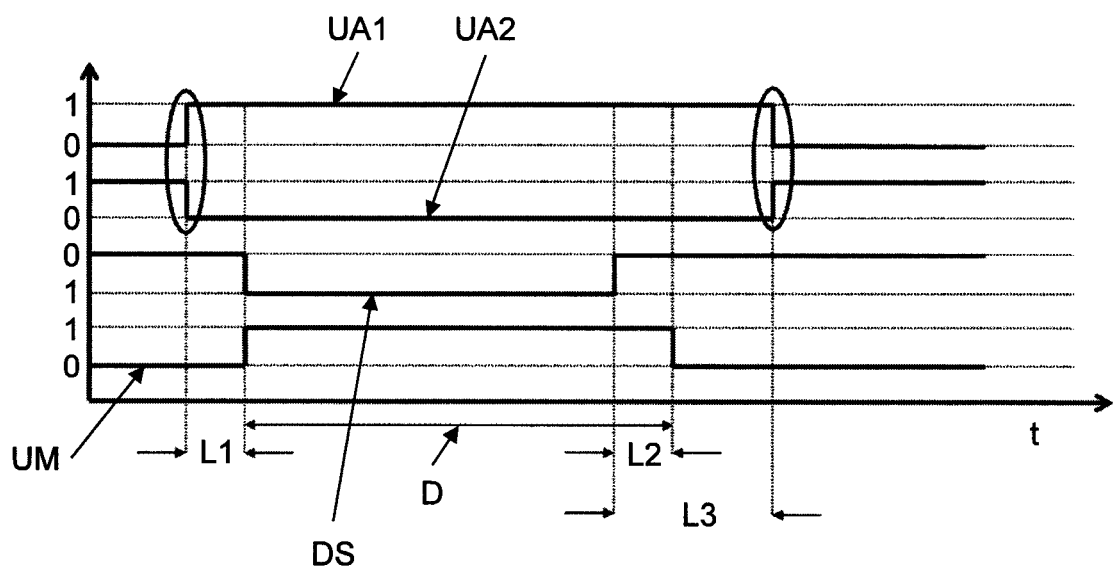
FIG. 2 a time diagram for signals that are received and transmitted by the safety controller in accordance with FIG. 1.

Different signal progressions are shown over the time tin FIG. 2. The signals are logic signals, with a value 0 corresponding to the state FALSE or INACTIVE and a value 1 corresponding to the state TRUE or ACTIVE.

In the upper part of FIG. 2, two bypass demands are shown that extend in a complementary manner to one another, with a first bypass demand UA1 being able to be received from the bypass input 16A and a second bypass demand UA2 being able to be received by the bypass input 16B. As can easily be recognized in FIG. 2, the bypass demands UA1, UA2 run synchronously with one another. The provision of two complementary bypass demands serves for the further increase of safety.

The signal progression of a detection signal DS is furthermore shown such as is transmitted by the protective device 22 and is received at the monitoring input 12.

Finally, the time period for which the safety controller 10 is operated in a bypass mode is represented by the signal progression UM.

A signal sequence such as is shown in FIG. 2, starts in that the control system 30 transmits the bypass demands UA1, UA2, i.e. the bypass demands UA1 and UA2 change from 0 to 1 or from 1 to 0 respectively. It is thereby signaled to the safety controller 10 that a permitted object 44 is to be expected and the bypass mode should be activated accordingly.

The arrival of a detection signal DS is now expected during a first latency time period L1. The first latency time period L1 corresponds to a specific conveying path that the object 44 covers between the triggering of the bypass demands UA1, UA2 and the interruption of the protected field 24 at a specific conveying speed. In the embodiment, the expected detection signal DS arrives at the end of the first latency time period L1. The bypass mode UM is simultaneously activated in the safety controller 10. The bypass mode UM is now active for a predefined detection time period D, with a minimal and/or maximum time duration being able to be predefined for the detection time period D. The detection time period D is oriented on the conveying speed and on the length of the object to be conveyed.

If the object 44 leaves the protected field 24 again, the detection signal DS drops, i.e. it changes its state from 1 to 0. At the same time, a second latency time period L2 starts to run after whose elapse the bypass mode UM is deactivated, i.e. the state of UM changes from 1 to 0. If, however, the protected field 24 is briefly released before the end of the second latency time period L2 and if the detection signal therefore changes back from 0 to 1, for instance due to a gap in the transported products, the bypass mode UM is continued. If the object 44 then again leaves the protected field 24 or if a further object gap is detected, the second latency time period L2 is again triggered.

If the bypass demands UA1, UA2 are already ended before the protected field 24 becomes free, a check can additionally be made whether the protected field 24 becomes free within a time duration after the end of the bypass demands UA1, UA2 corresponding to the second latency time period L2. In this case, the protected field 24 therefore has to be become free within a time period that corresponds to the second latency time period L2 so that no failure state is determined. This is conceivable, for example, in the event of an unusually long workpiece.

A third latency time period L3 starts to run simultaneously with the becoming free of the protected field 24, i.e. with the change of the detection signal from 1 to 0. An ending of the bypass demands UA1, UA2 is expected within this third latency time period L3.

As soon as irregularities occur in this routine of the above-described sequence step, i.e. e.g. as soon as one of said time periods is exceeded or as soon as specific signal changes do not occur, the system controller 10 can determine the presence of a failure state, store a corresponding error message and/or output it, for example to a corresponding signal output.

A failure state can in particular be determined in the following cases:
the detection signal DS is not received or is not received within the first latency time period L1;
a received detection signal DS ends before the elapse of a minimum time period or only after the elapse of a maximum time period;
the bypass demands UA1, UA2 are ended before an ending of the detection signal DS and the detection signal DS only ends after the elapse of the second latency time period L2 after the ending of the bypass demands UA1, UA2; and
after an ending of the detection signal DS, an ending of the bypass demands UA1, UA2 only takes place after the elapse of the third latency time period L3.

If the safety controller 10 is in a failure state, the output of a shutdown command only takes place when the protected field 24 is interrupted or infringed and a detection signal DS is accordingly output. Independently of such an interruption, the presence of a failure state can be acknowledged or canceled by an operator and the safety controller 10 can thus be set back into its starting state. The presence of a failure state can be stored as an error event for any desired time duration for a subsequent analysis.

It becomes clear from the above statements that there is a need to adapt the latency time periods L1 to L3, the minimal and/or maximum durations of the detection time period D to different transport speeds of the conveyor belt 42 and/or to different lengths of the transported objects 44. Depending on the demand, one or more of these time periods can be adapted. The adaptation takes place by transmitting corresponding configuration signals from the encoding apparatus 50 and/or of the control system 30 to the safety controller 10. The configuration signals can, for example, be transmitted in the form of logic states that can be decoded within the evaluation unit 20 with the aid of look-up tables or the like or by a transmission of corresponding numerical values.

The control system 30 can, for example, transmit the length of an object to be determined as a configuration signal, from which then the evaluation unit 20 can determine corresponding time periods, i.e. the latency time periods L1 to L3 and/or the detection time period D while taking account of the conveying speed of the conveyor belt 42 internally known or likewise transmitted as a configuration signal.

Only the configuration can also in particular be sufficient, with the aid of the encoding apparatus 50, for a one-time setup configuration for an operation in which the conveying speed and/or the transported product length does not change. The encoding can, for example, take place by means of a 1 of n encoding. For this purpose, the encoding apparatus 50 can, for example, have one or more switches, with a switch, for example, being able to be assigned to each time period to be configured and with the associated configuration signal being able to activate one of two values in dependence on the switch position.

It is understood that any desired other encoding forms are also possible. The transmission of configuration signals can further take place both by the encoding apparatus 50 and by the independent control system 30.

REFERENCE NUMERAL LIST

10 safety control
12 bypass input
14 control output
16A, 16B bypass input
18A, 18B configuration input
20 evaluation unit
22 protective device
24 protected field
30 control system
40 machine
42 conveyor belt
44 object
50 encoding apparatus
D detection time period
DS detection signal
F conveying direction
L1, L2, L3 latency time period
UA1, UA2 bypass demand
UM bypass mode

The invention claimed is:

1. A safety controller for the safety-directed monitoring and control of a machine, said safety controller comprising
   at least one monitoring input that is configured to receive a detection signal from a protective device;
   at least one control output that is configured to output a shutdown command to the machine to be monitored and controlled;
   at least one bypass input that is configured to receive a bypass demand from an independent control system; at least one configuration input that is connected to an evaluation unit and that is configured to receive a respective configuration signal; and
   an evaluation unit that is connected to the monitoring input, to the bypass input, and to the control output and that is configured to generate the shutdown command on the basis of a received detection signal, wherein the safety controller is operated in a bypass mode for a predefinable bypass time period divided into one or more part time periods after the reception of a bypass demand, with no shutdown command being output in the bypass mode at least during a part time period even on a reception of a detection signal,
   wherein the evaluation unit is configured to determine the bypass time period and/or at least a part time period of the bypass time period on the basis of the received configuration signal,
   wherein the evaluation unit is configured to determine a failure state,
   and wherein one of the part time periods is a predefinable detection time period for which a previously received detection signal has to last so that no failure state is determined, with the evaluation unit being configured to determine the detection time period on the basis of the received configuration signal.

2. The safety controller in accordance with claim 1, wherein the evaluation unit is configured to provide a signal at a failure output when an expected detection signal was not received within the bypass time period and/or within at least a part time period and/or an expected ending of a reception of a detection signal or of a bypass demand has not taken place.

3. The safety controller in accordance with claim 1, wherein a shutdown command is only output when a detection signal has been received after determining a failure state.

4. The safety controller in accordance with claim 1, wherein one of the part time periods is a predefinable first latency time period within which a detection signal has to be received so that no failure state is determined, with the evaluation unit being configured to determine the first latency time period on the basis of the received configuration signal.

5. The safety controller in accordance with claim 1, wherein the evaluation unit is configured to determine a minimum value and/or a maximum value for the duration of the detection time period on the basis of the received configuration signal.

6. The safety controller in accordance with claim 1, wherein one of the part time periods is a predefinable second latency time period, with the operation being ended in the bypass mode if no detection signal is received for the duration of the second latency time period and/or if the reception of the detection signal is also ended after ending the reception of the bypass demands within the second latency time period, with the evaluation unit being configured to determine the second latency time period on the basis of the received configuration signal.

7. The safety controller in accordance with claim 1, wherein one of the part time periods is a predefinable third latency time period within which the reception of the bypass demand has to have ended after ending of the operation of the safety controller in the bypass mode so that no failure state is determined, with the evaluation unit being configured to determine the third latency time period on the basis of the received configuration signal.

8. The safety controller in accordance with claim 1, wherein the configuration input is configured to receive the configuration signal from the independent control system.

9. The safety controller in accordance with claim 1, wherein an encoding apparatus is provided that is connected to the configuration input and that is configured to generate the configuration signal.

10. The safety controller in accordance with claim 1, wherein a plurality of configuration inputs are provided, with the configuration signals being transmitted as a 1 of n code.

11. A safety system having a safety controller according to claim 1 and having at least one protective device connected to the safety controller.

12. The safety system in accordance with claim 11, wherein the protective device is a piece of electro-sensitive protective equipment.

13. The safety system in accordance with claim 12, wherein the piece of electro-sensitive protective equipment is one of an optoelectronic sensor and an ultrasound sensor.

14. The safety system in accordance with claim 11, wherein the protective device is an optoelectronic sensor.

15. The safety system in accordance with claim 11, wherein the protective device is an ultrasonic sensor.

16. The safety controller in accordance with claim 1,
    wherein the evaluation unit is configured to determine a failure state,
    wherein one of the part time periods is a predefinable second latency time period, with the operation being ended in the bypass mode if no detection signal is received for the duration of the second latency time period and/or if the reception of the detection signal is also ended after ending the reception of the bypass demands within the second latency time period, with the evaluation unit being configured to determine the second latency time period on the basis of the received configuration signal, and wherein one of the part time periods is a predefinable third latency time period within which the reception of the bypass demand has to have ended after ending of the operation of the safety controller in the bypass mode so that no failure state is determined, with the evaluation unit being configured to determine the third latency time period on the basis of the received configuration signal.

17. A safety controller for the safety-directed monitoring and control of a machine, said safety controller comprising
at least one monitoring input that is configured to receive a detection signal from a protective device;
at least one control output that is configured to output a shutdown command to the machine to be monitored and controlled;
at least one bypass input that is configured to receive a bypass demand from an independent control system; at least one configuration input that is connected to an evaluation unit and that is configured to receive a respective configuration signal; and
an evaluation unit that is connected to the monitoring input, to the bypass input, and to the control output and that is configured to generate the shutdown command on the basis of a received detection signal, wherein the safety controller is operated in a bypass mode for a predefinable bypass time period divided into one or more part time periods after the reception of a bypass demand, with no shutdown command being output in the bypass mode at least during a part time period even on a reception of a detection signal,
wherein the evaluation unit is configured to determine the bypass time period and/or at least a part time period of the bypass time period on the basis of the received configuration signal,
and wherein one of the part time periods is a predefinable second latency time period, with the operation being ended in the bypass mode if no detection signal is received for the duration of the second latency time period and/or if the reception of the detection signal is also ended after ending the reception of the bypass demands within the second latency time period, with the evaluation unit being configured to determine the second latency time period on the basis of the received configuration signal.

18. A safety controller for the safety-directed monitoring and control of a machine, said safety controller comprising
at least one monitoring input that is configured to receive a detection signal from a protective device;
at least one control output that is configured to output a shutdown command to the machine to be monitored and controlled;
at least one bypass input that is configured to receive a bypass demand from an independent control system; at least one configuration input that is connected to an evaluation unit and that is configured to receive a respective configuration signal; and
an evaluation unit that is connected to the monitoring input, to the bypass input, and to the control output and that is configured to generate the shutdown command on the basis of a received detection signal, wherein the safety controller is operated in a bypass mode for a predefinable bypass time period divided into one or more part time periods after the reception of a bypass demand, with no shutdown command being output in the bypass mode at least during a part time period even on a reception of a detection signal,
wherein the evaluation unit is configured to determine the bypass time period and/or at least a part time period of the bypass time period on the basis of the received configuration signal,
wherein the evaluation unit is configured to determine a failure state,
and wherein one of the part time periods is a predefinable third latency time period within which the reception of the bypass demand has to have ended after ending of the operation of the safety controller in the bypass mode so that no failure state is determined, with the evaluation unit being configured to determine the third latency time period on the basis of the received configuration signal.

* * * * *